United States Patent [19]
Eddy

[11] 3,981,545
[45] Sept. 21, 1976

[54] TRACTION CONTROL APPARATUS

[75] Inventor: William C. Eddy, Birmingham, Mich.

[73] Assignee: Aspro, Incorporated, Westport, Conn.

[22] Filed: July 30, 1975

[21] Appl. No.: 600,505

[52] U.S. Cl. ............................ 303/21 EB; 188/170; 188/181 C
[51] Int. Cl.² ......................................... B60T 8/08
[58] Field of Search ........ 188/181 A, 181 C, 181 T, 188/181 R, 170; 303/21, 93, 96, 98, 102, 103, 111, 114, 9; 180/105 E, 105 R

[56] References Cited
UNITED STATES PATENTS

| | | | |
|---|---|---|---|
| 3,288,232 | 11/1966 | Shepherd | 303/21 EB X |
| 3,463,555 | 8/1969 | Ryskamp | 188/181 C X |
| 3,482,887 | 12/1969 | Sheppard | 303/21 BE |
| 3,844,625 | 10/1974 | Ingram et al. | 188/170 X |
| 3,869,177 | 3/1975 | Urban et al. | 303/9 X |
| 3,929,381 | 12/1975 | Durling | 303/9 X |

Primary Examiner—Duane A. Reger
Attorney, Agent, or Firm—Lawrence E. Laubscher

[57] ABSTRACT

A traction control system is disclosed for use with a vehicle braking system including a plurality of driven wheels connected by differential means, wheel brake means associated with each driven wheel, and spring brake-operating means for operating each of the wheel brakes, respectively, each of said spring brake means including a brake diaphragm operable between brake-engaged and brake-released positions, a locking spring operable to place the brake diaphragm in the brake-engaged position, and a spring diaphragm operable between a normal spring-disabling position and a spring-enabling position in which the locking spring is inoperative and operative, respectively; characterized by the provision of means for generating for each driven wheel a velocity sensing signal, comparison circuit means for comparing said sensing signals to produce a control voltage when the rotational velocity of one driven wheel exceeds another by a predetermined amount, and means operable by said control signal for placing in the spring-enabling position the spring diaphragm associated with the faster driven wheel, thereby to effect braking of the faster driven wheel and to produce transfer of driving torque to the slower driven wheel. Furthermore, the invention has utility in conjunction with tandem wheel vehicles including pairs of said driven wheels which are connected through interaxle differential means, means being operable when the velocity of one pair of driven wheels exceeds another by a predetermind amount for placing in the spring-enabling positions the spring diaphragms associated with the wheels of the faster driven wheel pair.

13 Claims, 6 Drawing Figures

TRACTION CONTROL APPARATUS

BRIEF DESCRIPTION OF THE PRIOR ART

As evidenced by the U.S. Pat. Nos. to Eger et al. 3,025,722 and Mikina 3,253,672 (in which proprietory rights are held by the assignee of the instant invention), and the U.S. Pat. Nos. to Shepherd 3,169,595 and 3,288,232, among others, it is known in the vehicle traction control art to provide means for braking one of a pair of driven wheels (arranged on opposite sides of the vehicle and connected by a differential) when that one wheel overruns the other by a predetermined amount (such as might occur, for example, when the one wheel spins on ice), whereby the driving torque is transferred through the differential to the slower driven wheel. These known systems normally include speed sensing means associated with the driven wheels, respectively.

It is also known in recent years, as a safety feature in the vehicle braking system art, to provide spring brake-operating means associated with each of the wheel brake means of the driven wheels. These known spring brake-operating means each include a brake diaphragm connected with the associated wheel brake means, said brake diaphragm being operable between brake-engaged and brake-released positions in which the associated wheel brake means is engaged and released, respectively. Means including a locking spring normally bias the brake diaphragm toward the brake-engaged position and means including a spring diaphragm operable between enabling and disabling positions serve to place the locking spring in operative and inoperative conditions, respectively, relative to said brake diaphragm. First conduit means containing a foot-operated control valve supplies pressure fluid simultaneously to one side of each of the brake diaphragms to displace the same toward their brake-engaged positions to simultaneously effect actuation of all of the wheel brake means associated with the driven wheels. Second conduit means containing a normally open parking brake valve supplies pressure fluid simultaneously to one side of each of the spring diaphragms to displace the same toward their spring-disabling positions, whereby the locking springs are rendered inoperative and have no effect on the brake diaphragms. One example of the known spring brake operating means is the Anchorlok piggy back spring brake device manufactured by the Anchorlok Division of Royal Industries Compton, California. An example of a tandem axle braking system including spring brake operating means is disclosed in Commercial Car Journal, January, 1975, page 75.

Finally, it is known in the prior art to provide antiskid sustems which operate in conjunction with standard air brake actuation systems to govern wheel deceleration and maintian vehicle stability. The anti-skid system includes three major components which form a sensing and control loop which adjusts braking torque to conditions existing at the tire-road interface. At each wheel of an axle, a sensor constantly monitors the speed of the wheel and feeds this information into a computer logic module. The module, in turn, analyzer the wheel velocity data and provides control signals to an air modulator valve which regulates the air pressure applied to the service brake chambers to govern wheel deceleration and maintain vehicle stability. A disclosure of such a braking system manufactured by Wagner Electric Corp. is presented in Automotive Engineering, February, 1975, page 6. The wheel brake means of the Wagner system are operable by the aforementioned spring brake operating means.

SUMMARY OF THE PRESENT INVENTION

The present invention relates to an improved traction control system for use with single axle or tandem axle vehicles having spring brake-operating means of the type described above, said traction control system being suitable either for retrofit to existing vehicles, or for installation as part of the original equipment of new vehicles. The traction control system of the present invention is particularly adapted for use with anti-skid braking systems (which already include velocity sensors associated with the driven wheels, and sometimes with the driving wheels as well).

Accordingly, a primary object of the present invention is to provide a traction control system adapted for use with a vehicle braking system of the type including spring brake-operating means associated with the wheel brake means of each driven wheel. The traction control means includes wheel velocity sensors associated with an opposed pair of driven wheels connected by a differential mechanism for generating signal voltages which are a function of the rotational velocities of the driven wheels, respectively; voltage comparison circuit means for producing a control voltage when the rotational velocity of one driven wheel of the pair exceeds that of the other driven wheel of the pair by a predetermined value; and means responsive to the control voltage for placing in the operative condition that locking spring which is associated with the driven wheel having the greater rotational velocity, whereby the faster wheel is braked and driving torque is transferred to the driven wheel of the pair having the lower rotational velocity.

According to a more specific object of the invention, the control-voltage-responsive means comprises solenoid-operated valves connected in the conduit means which normally supply pressure fluid to the spring brake-operating means to normally maintain in the inoperative condition the locking springs associated with each of the wheel brake means of the pair of driven wheels, respectively. That solenoid valve which is associated with the spring brake operating means of the faster driven wheel is operating by the control voltage to vent and interrupt the supply of pressure fluid to the pressure compartment of the spring diaphragm which normally maintains the locking spring in the inoperative condition, whereupon the spring diaphragm is displaced to its enabling position and the locking spring is rendered operative to effect braking of the faster wheel of the pair. The pressure fluid for operating the brake and spring diaphragms of the spring brake-operating means may be either a compressed gas (such as air), or a liquid (such as oil). The conduit means for supplying pressure fluid to operate the brake diaphragms includes a conventional foot-lever-operated brake control valve, and the conduit means for supplying pressure fluid to normally maintain the spring diaphragms in their spring-disabling positions includes a conventional parking brake control valve. Preferably the wheel brake means associated with each driven wheel of the pair is of the cam-roller type including a cam roller operable by the brake diaphragm of the associated spring brake operating means for pivoting the brake shoe in the brake-engaged direction.

According to a further object of the invention, the traction control system of the present invention is adapted for use with a vehicle braking system of the tandem axle type including a first pair of driven wheels arranged on opposite sides of the vehicle and connected by first differential means, a second pair of driven wheels arranged on opposite sides of the vehicle, and interaxle differential means including second differential means connecting the driven wheels of the second pair, a drive shaft, an interaxle drive shaft for driving the first differential means, and means connecting the drive shaft with said second differential means and with said interaxle drive shaft. The traction control means includes first comparison circuit means for producing a first control voltage when one wheel of the first pair overruns the other by given amount, and first-control-voltage-responsive means for braking the faster running wheel of the first pair, thereby to transmit driving torque to the slower wheel of the pair. The traction control means further includes second comparison circuit means for producing a second control voltage when one wheel of the second pair overruns the other by a given amount, and second-control-voltage-responsive means for braking the faster wheel of the second wheel pair, thereby to transmit driving torque to the slower wheel of the second pair. In accordance with another object, third comparison circuit means are provided for comparing the speed of one wheel pair with the other wheel pair and for generating a third control signal when the speed of one wheel pair exceeds that of another by a predetermined value. Means responsive to the third control voltage effect simultaneous braking of both wheels of the faster pair, thereby to transmit driving torque to the wheels of the slower pair. In one embodiment, the speeds of the wheels of one pair are summed to provide a first signal voltage and the speeds of the wheels of the other pair are summed to provide a second signal voltage, said first and second signal voltages being compared by said third comparison circuit means. In a second embodiment, shaft velocity sensors associated with the drive and interaxle shafts of the interaxle differential are provided for generating the signal voltages which are compared by the third comparison circuit means.

BRIEF DESCRIPTION OF THE FIGURES

Other objects and advantages of the invention will become apparent from a study of the following specifications when viewed in the light of the accompanying drawing, in which.

DETAILED DESCRIPTION

Figure 1:
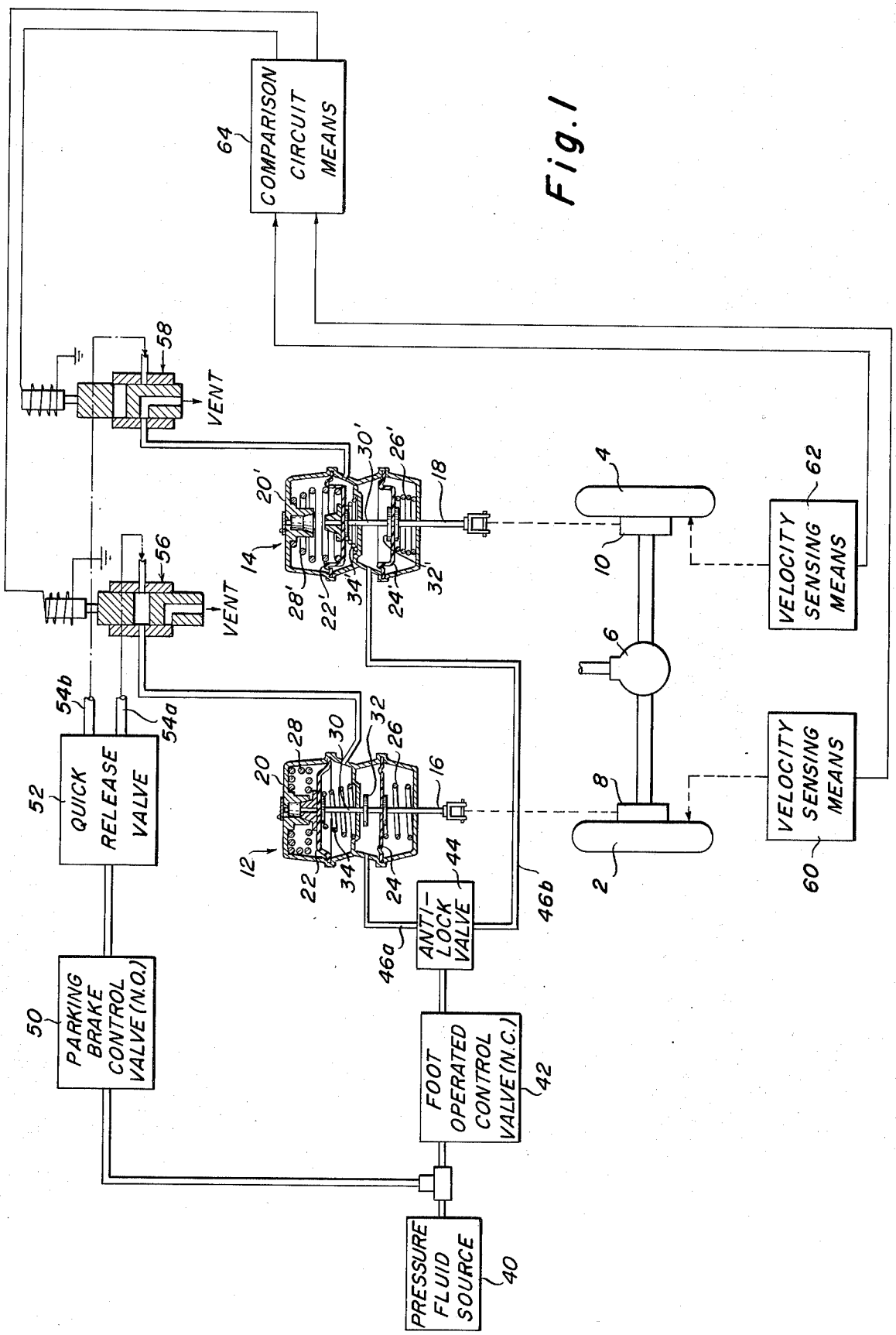
FIG. 1 is a schematic diagram illustrating the traction control means of the present invention applied to the spring-brake-operated braking system of a vehicle having a pair of driven wheels connected by a differential mechanism.

Referring now to FIG. 1, the vehicle braking system for braking the driven wheels 2 and 4, which are connected by a conventional differential mechanism 6, includes wheel brake means 8 and 10 associated with the driven wheels 2 and 4, respectively. The wheel brake means are operated by spring brake-operating means 12 and 14, respectively, which have output members 16 and 18 that are connected with the wheel brake means 8 and 10, respectively. Each of the wheel brake means includes a housing 20 containing upper and lower chambers in which are mounted a spring diaphragm 22 and a brake diaphragm 24, respectively. The brake diaphragm is connected with the output member which in turn operates the associated wheel brake means, which diaphragm is movable between an upper brake-disengaged position and a lower brake-engaged position. A brake diaphragm spring 26 mounted in the lower compartment of the lower chamber normally biases brake diaphragm 24 upwardly toward the brake-disengaged position. Mounted in the upper compartment of the upper chamber is a brake-locking compression spring 28. Pusher rod means 30, which is mounted for sealed sliding vertical movement in an opening contained in the housing wall separating the upper and lower chambers, is connected at its upper end with the spring diaphragm 22, the lower end of the pusher rod means carrying a pusher plate 32. The spring diaphragm 22 is movable between an upper spring-disabling position and a lower spring-enabling position. When diaphragm 22 in its upper spring-disabling position, compression spring 28 is completely compressed, and the pusher plate 32 is completely withdrawn from the brake diaphragm 24. When spring diaphragm 22 is in the lower spring-enabling position, the pusher rod means 30 is displaced downwardly to cause pusher plate 32 to force brake diaphragm 24 downwardly to the brake-engaged position, whereby the associated wheel brake means is in the braked condition. Small compression spring 34 arranged in the lower compartment of the upper chamber normally applies slight upward biasing force to the spring diaphragm 22.

Pressure fluid, such as compressed air or a liquid such as oil, from pressure sources 40 may be supplied simultaneously to the upper compartments of the lower chambers of both wheel brake operating means via first conduit means including a foot-operated control valve 42, anti-lock valve 44, and first conduit branches 46a and 46b, thereby to place both brake diaphragms in their lower brake engaged positions to effect simultaneous braking of the two wheel brake means 8 and 10. Pressure fluid from source 40 may also be supplied to the pressure fluid source 40 to the lower compartments of the upper chambers of both spring brake operating means via second conduit means including a normally open parking brake control valve 50, quick-release valve means 52, and second conduit branches 54a and 54b which contain two-position three-way solenoid valve means 56 and 58, respectively. Each of the solenoid valve means includes a normally de-energized position in which the lower compartment of the upper chamber of the associated spring brake operating means is connected with the pressure source, and an energized position in which the lower compartment of the upper chamber of the associated housing is isolated from the pressure source and is connected to vent (i.e., venting to atmosphere or venting to the accumulator or to sump).

In accordance with the present invention, traction control means are provided which are operable — when the rotational velocity of one driven wheel exceeds that of the other driven wheel by a predetermined amount — to brake the faster driven wheel, whereby driving torque is transmitted via the differential means 6 to the slower driven wheel. More particularly, a pair of velocity sensing means 60 and 62 are associated with the driven wheels 2 and 4, respectively, for generating signal voltages which are a function of the rotational velocities of the respective driven wheels. The velocity sensing means are well known in the art and may be magnetic pick-up means, tachometer generator means, or the like. The signal voltages are applied to the input terminals of comparison circuit means 64 having output terminals connected with the solenoids associated with the solenoid valves 56 and 58, respectively. When the driven wheels have generally the same rotational velocity, no control signal is provided to either of the output terminals of the comparison circuit means, and consequently the solenoid valves 56 and 58 are in their normally deenergized condition. When, however, the rotational velocity of one driven wheel exceeds that of the other driven wheel by a predetermined amount, the comparison circuit means produces a control voltage which is transmitted to the solenoid of the valve that is connected with the spring brake operating means associated with the faster wheel, whereupon the solenoid valve is energized to vent the lower compartment of the upper chamber of the housing associated with the faster driven wheel, whereby the locking spring of that housing displaces the associated brake diaphragm downwardly toward the brake-engaged position to lock the corresponding wheel brake means.

Figure 2:
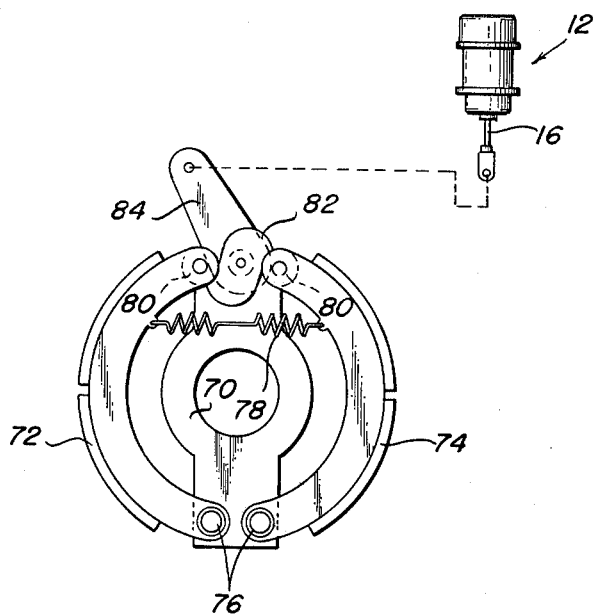
FIG. 2 is a detailed perspective view of the manner in which the cam-roller wheel brake means are operated by the spring brake operating means.

In the illustrated embodiment, the wheel brake means 8 and 10 are of the cam roller type illustrated in FIG. 2. More particularly, the wheel brake means includes a brake spider 70, a pair of brake shoes 72 and 74 each pivotally connected at one end by an anchor pin 76 to the brake spider 70, and a brake drum (not shown) arranged concentrically about the brake shoes. Brake spring 78 connected between the free ends of the brake shoes biases the brake shoes together toward a brake-released position relative to the brake drum. At the free ends of the brake shoes are provided cam rollers 80 which are adapted to engage the surfaces of rotatable cam 82 that is rotatable about its axis by crank lever 84 that is in turn connected with the output shaft of the associated wheel brake locking means. Consequently, when the output shaft of the spring brake operating means is displaced downwardly by the brake diaphragm 24, cam 82 is rotated to separate the brake shoes into braking engagement with the associated brake drum.

The comparison circuit means 64 may be one of many such circuits in accordance with the type of velocity sensing means being used with the system.

Figure 3:
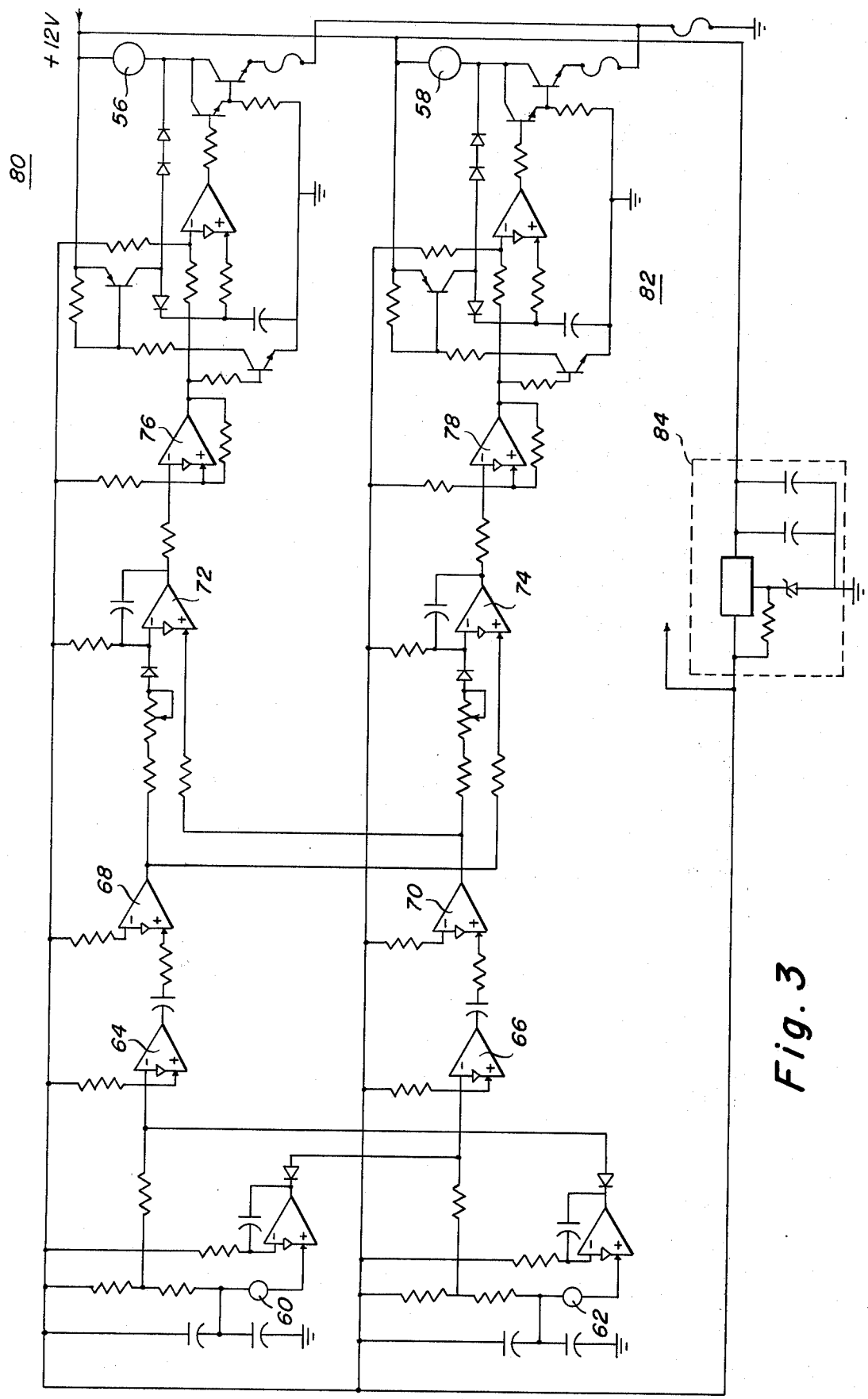
FIG. 3 is a schematic electrical diagram of the comparison circuit means of FIG. 1.

The nature of the comparison circuit means included in the traction control system depends, of course, on the specific nature of the wheel velocity sensing means. Referring to FIG. 3, one embodiment of the comparison circuit means is disclosed which is adapted for use with velocity sensing means 60 and 62 of the magnetic pick-up. As shown in FIG. 3, the vehicle speed sensing devices 60 and 62 generate sine wave signal voltages that are supplied to the inputs of squarer amplifiers 64 and 66 which convert the sine waves to square waves. The signal voltages then pass through pulse shaping amplifiers 68 and 70 that produce pulses of equal width, the number of the pulses corresponding with the rotational velocities of the respective driven wheels. The output terminal of each pulse shaping amplifier is connected to the input terminals of a pair of integrating amplifiers 72 and 74 that are part of a differential circuit which sets the wheel speed differential. The rising direct-current signals from the integrating amplifiers are fed to the input terminals of a pair of comparators with hysteresis 76 and 78, respectively. Each of the comparators serves as a voltage level sensing means for actuating the associated output stage 80 and 82 when the predetermined differential value is exceeded, thereby to eneergize the corresponding solenoid of the associated solenoid valve means 56 and 58, respectively. The regulated voltage power supply 84 supplies + 10 volt power to the comparison circuit.

OPERATION

In operation, it will be assumed that the motor vehicle is driven in a linear path whereby both driven wheels 2 and 4 on opposite sides of the vehicle have the same rotational velocity. Both solenoid valves 56 and 58 are in their de-energized conditions, and consequently pressure fluid is supplied from source 40 to the lower compartments of the upper chambers of the housings of the spring brake-operating means via the normally open parking brake control valve 50, quick release valve 52, branch conduits 54a and 54b and solenoid valves 56 and 58, respectively. Consequently, spring diaphragms 22 of both spring brake operating means 12 and 14 are displaced upwardly to their locking-spring disabling positions, thereby raising the pusher plates 32 from their respective brake diaphragms 24. Consequently, the locking spring means 28 are rendered inoperative, and the brake diaphragms 24 are free for normal operation. Thus, when the foot-operated control valve 42 is slightly opened, pressure fluid is supplied to the upper compartments of the lower chambers via control valve 42, anti-lock valve 44 and the first conduit branches 46a and 46b, respectively, thereby to effect simultaneous braking of the driven wheels 2 and 4.

When the vehicle enters a turn, one driven wheel has a greater rotational velocity than the other owing to the differential mechanism 6, but the value of the signal voltage produced by either sensing means 60 or 62 is insufficient to exceed the voltage level set by the level sensing means 76 and 78, and consequently both solenoid valves 56 and 58 remain in their de-energized conditions during a turn, whereby the locking spring diaphragms are maintained in their spring-disabling positions by the pressure fluid supplied via the second conduit means. In the event that the vehicle is braked to a stop and the parking brake control valve 50 is closed, quick release valve 52 operates to vent the lower compartments of the upper chambers of the spring brake operating means, whereby locking springs 28 become operative to displace pusher rod means 30 downwardly so that all of the brake diaphragms are displaced downwardly by their associated pusher plate means 32 to the brake-engaged position, thereby operating the associated brakes 8 and 10 to their brake-engaged conditions.

In the event that, upon the application of driving torque to the input shaft to the differential means 6, the right driven wheel 4 is caused to rotate at a faster rotational velocity than the left driven wheel 2 (such as might occur, for example, when the right driven wheel 4 is on ice and the left driven wheel 2 has traction with the road surface), the velocity signal voltage produced by sensing means 62 exceeds that of sensing means 60 by a predetermined value as determined by the integrating amplifier means 72 and 74 and the comparator means 76 and 78, whereupon output stage 82 is activated to energize the solenoid associated with the solenoid valve means 58, whereby the valve means 58 assumes the energized position illustrated in FIG. 1. Consequently, the supply of pressure fluid to the lower compartment of the upper chamber of the housing of the spring brake operating means 14 is interrupted, and this lower compartment is vented (to atmosphere or to the system accumulator, for example) via solenoid valve means 58. Consequently, spring diaphragm 22' is lowered to its illustrated spring-enabling position in which locking spring 28' expands to force pusher rod means 30' and pusher plate 32' downwardly to place brake diaphragm 24' in its brake-engaged position, thereby displacing output shaft 18 downwardly to operate wheel brake means 10 to the braked condition. Since pressure fluid continues to be supplied to the lower compartment of the upper chamber of the other spring brake operating means 12, the spring diaphragm 22 thereof remains in its illustrated spring-disabling position, thereby compressing spring 28 to its inoperative condition. Assuming that foot-operated control valve 42 remains in its normally closed condition, brake diaphragm 24 remains in its illustrated brake-released position. Since the right wheel brake means 10 is now braked and the left hand wheel brake means 8 is in the brake-released condition, driving torque is transferred to the left driven wheel 2 to propel the vehicle off the ice. When the difference between the velocity signal voltages no longer exceeds the predetermined value set by the differential circuit means and the level sensing means 76 and 78, output stage 82 becomes deactivated and solenoid valve means 58 becomes deenergized, whereupon pressure fluid is again supplied to the lower compartment of the upper chamber of the spring brake operating means 14, whereupon the wheel brake means 10 returns to its released condition.

Figure 4:
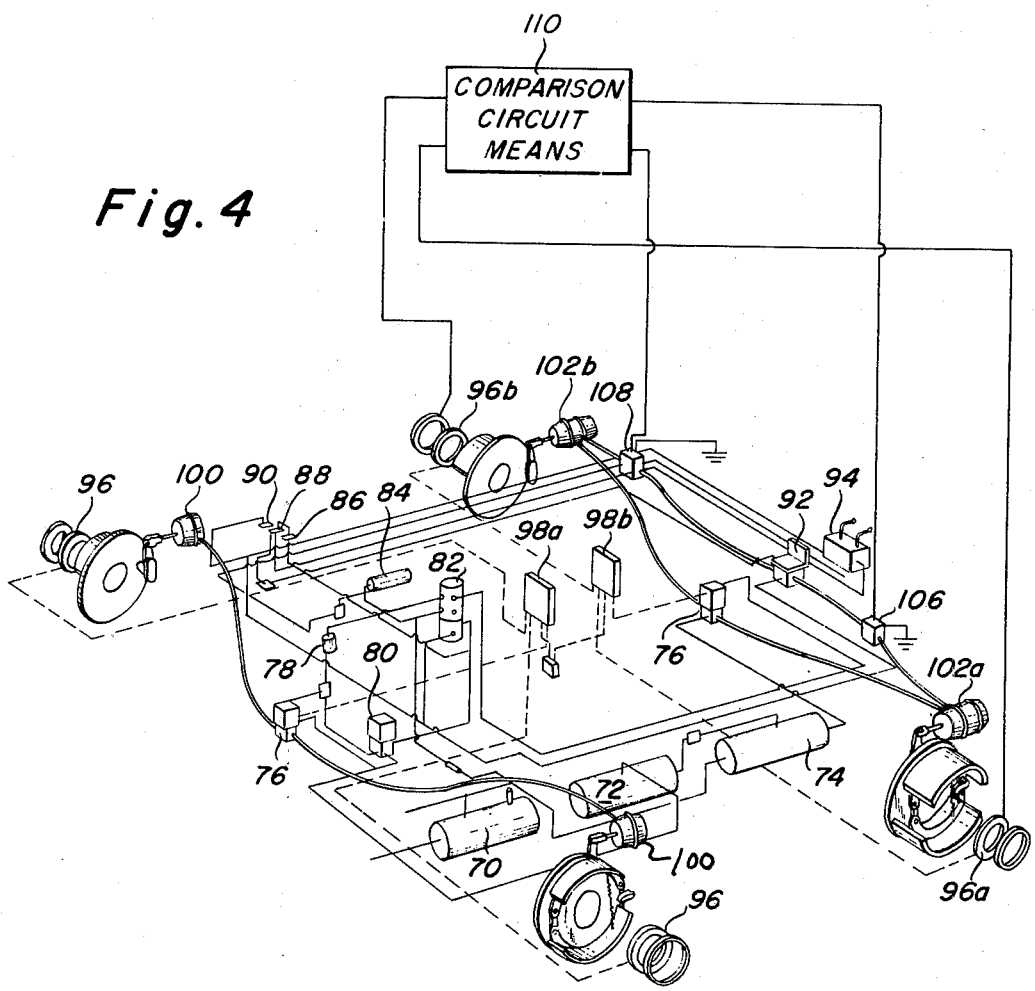
FIG. 4 is an hydraulic and electric schematic diagram illustrating the manner in which the electric traction control system of the present invention is applied to an existing fully integrated anti-skid system.

The traction control system of the instant invention may be applied as a retrofit addition to an existing anti-skid braking system as shown in FIG. 4. The conventional braking system includes a supply reservoir 70, a front service reservoir 74. As is known in the art, the braking system includes an air modulator valve 76, a brake pressure distribution valve 78, a front wheel emergency valve 80, air application valve 82, and valve 84, a tractor-trailer emergency and parking valve 86, a tractor parking valve 88, and a trailer valve 90. Furthermore, the braking system includes a relay quick-release valve 92, and a tractor protection valve 94. Wheel speed sensors 96 are provided with each of the wheels for supplying signals to the skid control computer modules 98a and 98b. Conventional single-chamber brake housings 100 are provided for operating the brake means associated with the front pair of wheels, and two-chamber spring brake-operating means 102a and 102b are provided for operating the wheel brake means associated with the left and right driven wheels (which are connected by conventional differential means, not shown).

In accordance with the traction control system of the present invention, 3-way solenoid valve means 106 and 108 are connected in the second conduit means between the quick-release valve 92 and the spring brake operating means associated with the left and right driven wheels, respectively. The signal voltages produced by the left and right wheel sensors 96a and 96b are supplied to the input terminals of comparison circuit means 110. In the event that the rotational velocity of one driven wheel exceeds that of the other by a predetermined value, a control voltage is produced by the comparison circuit means which operates the appropriate solenoid valve means to brake the faster driven wheel, whereby torque is transferred to the slower driven wheel, as described above with reference to FIGS. 1–3.

Figure 5:
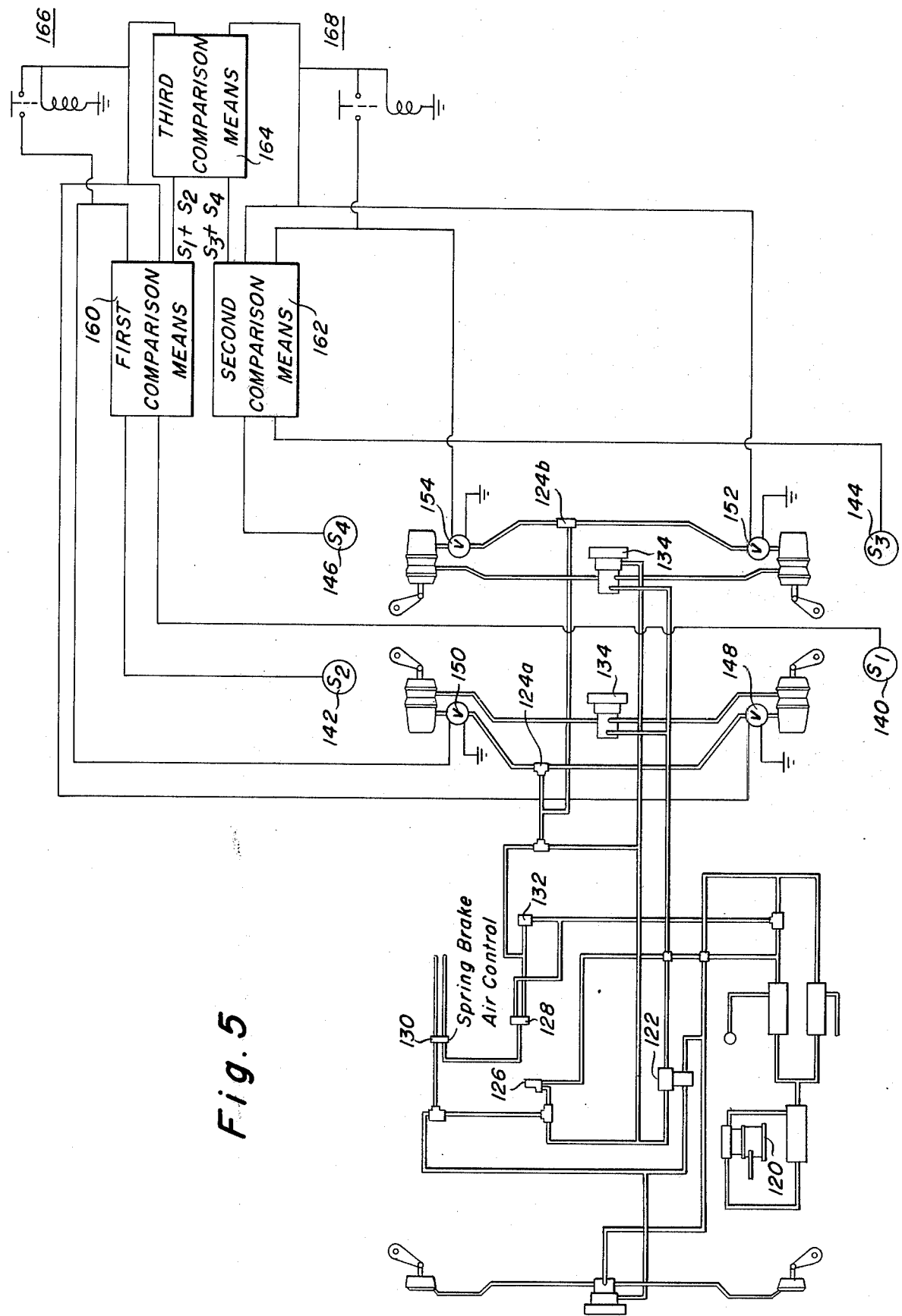
FIG. 5 is an hydraulic and electric schematic diagram illustrating the manner in which the electrical traction control system of the present invention is applied to an existing tandem axle braking system.

Referring now to FIG. 5, the traction control means of the present invention is also adapted for retrofit application to an existing tandem axle vehicle braking system including an air compressor 120, foot-operated control valve 122, quick-release valve 124, hand control valve 126, trailer air control valve 128, tractor protection valve 130, park control valve 132, and antilock valves 134.

In accordance with the traction control system of the present invention, wheel sensors 140 and 142 are associated with the left and right driven wheels of a first pair of wheels connected by differential means (not shown), and sensors 144 and 146 are associated with the left and right wheels of a second pair of driven wheels connected by differential means (not shown). Solenoid valves 148 and 150 are connected between the quick-release valve 124a and the left and right 2-chamber spring brake operating means associated with the left and right driven wheels, respectively, of the first pair, and solenoid valves 152 and 154 are connected between the quick-release valve 124b and the left and right 2-chamber spring brake operating means associated with the driven wheels, respectively, of the second wheel pair. The signal voltages produced by sensors 140 and 142 are supplied to the input terminals of first comparison means 160 which is operable to produce control voltage for operating the solenoid valves 148 and 150. Consequently, if one of the wheels of the first pair overruns the other by a predetermined amount, its associated solenoid valve is energized to effect braking of the faster wheel as described above. Similarly, the signal voltages produced by the sensors 144 and 146 are fed to the input terminals of second comparison circuit means 162 for producing control voltages which selectively operate the solenoid valves 152 and 154 for braking a faster running wheel of the pair as described above. In this tandem axle embodiment of the invention, third comparison circuit means 164 are provided having a pair of input terminals to which are provided a first summed signal that is a function of the sum of the signal voltages produced by sensors 140 and 142, and a second summed signal that is a function of the sum of the signal voltages produced by the sensors 144 and 146. These summed signals may be produced either by appropriate circuitry in the first and second comparison circuit means, or by separate conventional summing devices (not shown). The third comparison means 64 is thus operable to determine when the rotational velocity of one pair of wheels exceeds that of the other pair of driven wheels by a predetermined value, and for simultaneously operating both solenoids associated with the wheels of the faster running pair. More particularly, one output terminal of the third comparison circuit means is connected directly with solenoid valve 148, and also with the solenoid valve 150 via relay holding switch means 166. Similarly, the other output terminal of the third comparison means is directly connected with solenoid valve 152, and also with the solenoid valve 154 via the self-energizing relay holding switch 168. Therefore, when the two pairs of wheels have either the same velocity or a velocity difference that is less than a predetermined amount, the third comparison means 164 is deactivated, and the solenoids associated with the respective pairs of wheels are only operable by the first and second comparison circuit means. On the other hand, when the speed differential between one pair of wheels exceeds that of the other pair of wheels by a predetermined amount, the third comparison means is operable to provide a control voltage that operates both of the solenoid valve means associated with the wheels of the overrunning pair. Such a condition might occur, for example, when the tandem axle vehicle is driven upon a sharp incline which will lift one pair of wheels slightly from the road surface.

Figure 6:
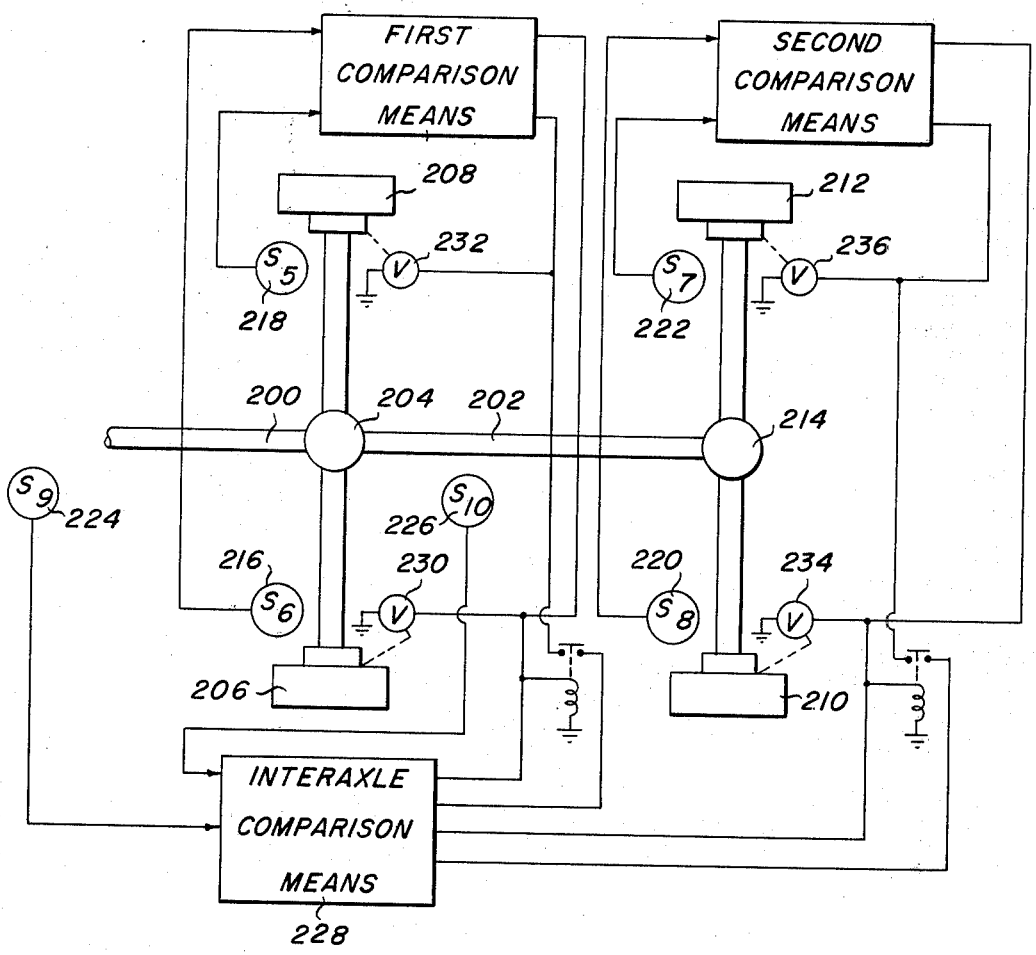
FIG. 6 is a detailed electrical schematic diagram of a modification of the electric traction control system of FIG. 5.

FIG. 6 illustrates a modification of the tandem wheel system of FIG. 5. As illustrated in this figure, the input drive shaft 200 is connected to the inner axle drive shaft 202 by interaxle differential means 204 which are known in the art (as evidenced, for example, by the Bokovoy U.S. Pat. No. 3,706,350). The interaxle differential means 204 also includes differential means connecting the forward pair of driven wheels 206 and 208, and the rearward pair of driven wheels 210 and 212 are connected by a conventional differential mechanism 214. In addition to the wheel sensors 216, 218, 220 and 222 associated with each of the driven wheels, respectively, an additional pair of rotational speed sensors 224 and 226 are associated with the drive shaft 200 and the interaxle shaft 202, respectively. These two additional sensors generate signal voltages which are applied to the input terminals of the interaxle comparison means 228. The solenoid valve means 230 and 232 associated with the driven wheels 206 and 208 are operable by the first comparison means for braking the overrunning wheel of the wheel pair in the manner described above. Similarly, the second comparison means selectively controls the operation of solenoid valve means 234 and 236 to selectively brake the associated wheel in the event that one wheel of this wheel pair overruns the other by a predetermined amount. In the event that one pair of wheels overruns the other pair of wheels by a predetermined amount, the signal voltages of the sensors 224 and 226 supplied to the comparison means 228 result in the generation of a control voltage at the output terminal of the interaxle comparison means which simultaneously energizes both solenoids associated with the pair of overrunning wheels, thereby braking the overrunning pair of wheels until the speed thereof falls within a given value relative to the other pair of driven wheels.

It should be mentioned that the 3-way solenoid valve means are conventional components known in the art (for example, the 3-way solenoid valve product produced by Automatic Switch Co., Florham Park, New Jersey). The other components of the vehicle braking system and the traction control system are conventional commercially obtainable items.

It is apparent that as a consequence of the use of the spring brake-operating means for effecting traction control, the instant invention results in the important advantage that the pressure side of the primary braking system is never interfered with, the traction control being effected solely on the secondary side of the braking system.

While in accordance with the provisions of the Patent Statutes, the preferred form and embodiments of the invention have been illustrated and described, it will be apparent to those skilled in the art that various changes may be made in the described apparatus without deviating from the inventive concepts set forth above.

What is claimed is:

1. A traction control system for a vehicle including at least one pair of driven wheels arranged on opposite sides of the vehicle and connected by a differential mechanism, a plurality of wheel brake means associated with said driven wheels, respectively, and a plurality of brake-operating means for operating said wheel brake means, respectively, each of said brake operating means including a brake-operating member (24, 24') operable between brake-engaged and brake-released positions;

said traction control system comprising
a. a plurality of spring brake-locking means associated with each of said brake-operating members; respectively, each of said spring brake-locking means including
1. spring means (28, 28') normally placing the brake-operating member in its brake-engaged position; and
2. disabling means (22, 22') operable between enabling and disabling conditions for activating and de-activating said spring means relative to said brake operating member, respectively;
b. a plurality of velocity sensing means (60, 62) for generating signal voltages which are a function of the rotational velocities of said driven wheels, respectively;
c. voltage comparison circuit means for comparing said signal voltages of said driven wheels, respectively, and for producing a control signal when the rotational velocity of one driven wheel exceeds that of the other driven wheel by a predetermined value; and
d. means (56, 58) responsive to said control signal for operating to its enabled condition the disabling means associated with the driven wheel having the faster rotational velocity, thereby to effect braking of the faster driven wheel, whereby driving torque is transferred through said differential means to the driven wheel having the lower rotational velocity.

2. Traction control means adapted for use with a vehicle including at least one pair of driven wheels arranged on opposite sides of the vehicle; means including a differential mechanism for driving said driven wheels; a plurality of wheel brake means associated with each of said driven wheels, respectively; a plurality of brake-operating means for operating each of said wheel brake means, respectively, each of said brake operating means including a housing, a brake diaphragm (24, 24') mounted in said housing to define first and second compartments, said brake diaphragm being operable between brake-engaged and brake-released positions in which the associated brake means are in braking and released conditions, respectively; a plurality of brake-locking means associated with each of said brake-operating members, respectively, each of said brake-locking means including brake spring means (28, 28') for normally biasing the associated brake diaphragm toward its brake engaged position; and a plurality of disabling means associated with said brake-locking means, respectively, each of said disabling means including a spring diaphragm (22, 22') mounted in the associated housing to define third and fourth compartments in one of which the associated spring means is mounted, said spring diaphragm being operable between spring-enabling and spring-disabling positions in which said spring means is activated and deactivated relative to said brake diaphragm, respectively; said vehicle braking system further including first conduit means (46a, 46b) for supplying pressure fluid simultaneously to one of said first and second compartments of each of said housings to position all of said brake diaphragms in their brake-engaged positions, and second conduit means (54a, 54b) for supplying pressure fluid simultaneously to one of said third and fourth compartments of each of said housings to position all of said spring diaphragms in their disabling positions;

said traction control means including
a. a plurality of velocity sensing means (60, 62) for generating signal voltages which are a function of the rotational velocities of said driven wheels, respectively;
b. voltage comparison circuit means (64) for comparing said signals voltages of said one pair of driven wheels and for producing a control signal when the rotational velocity of one driven wheel of said pair exceeds that of the other driven wheel of said pair by a predetermined value; and
c. solenoid valve means responsive to said control signal for placing in the spring enabling position only that spring diaphragm which is associated with the driven wheel having the greater rotational velocity, thereby to effect selective braking of the faster wheel of said one wheel pair, said solenoid valve means including a plurality of solenoid valves (56, 58) connected in said second conduit means for interrupting the supply of pressure fluid to, and for simultaneously venting, the said one of said third and fourth compartments of that housing which is associated with the driven wheel having the greater rotational velocity.

3. Apparatus as defined in claim 2, wherein each of said valve means comprises a solenoid valve having a first position in which pressure fluid is supplied to the associated said one of said third and fourth compartments, and a second position in which the supply of pressure fluid is interrupted and the said one of said third and fourth compartments is vented.

4. Apparatus as defined in claim 3, wherein each of said wheel brake means is of the cam roller type including a brake spider, a pair of opposed brake shoes each pivotally connected at one end with said spider, a brake drum arranged concentrically about said brake shoes, brake spring means pivotally biasing said brake shoes toward a disengaged condition relative to said drum, and cam roller means operable by the associated brake diaphragm for displacing said brake shoes toward a brake-engaging condition relative to said brake drum.

5. Apparatus as defined in claim 2, wherein the fluid of said pressure fluid source is a compressed gas.

6. Apparatus as defined in claim 5, wherein said fluid is air.

7. Apparatus as defined in claim 2, wherein the fluid of said pressure fluid source is a liquid.

8. Apparatus as defined in claim 2, wherein said first conduit means contains a foot-controlled brake valve for simultaneously operating all of said wheel brake means to their braked condition, and further wherein said second conduit means includes a parking brake control valve for simultaneously operating all of said wheel brake means to their braked condition.

9. Apparatus as defined in claim 1, and further wherein said vehicle braking system is of the tandem axle type including a second pair of driven wheels arranged on opposite sides of the vehicle; wherein said differential mechanism includes first differential means connecting said one pair of driven wheels and tandem axle differential means including a drive shaft, second differential means connecting the driven wheels of said second pair, means including an interaxle drive shaft connecting said first and second differential means, and means connecting said drive shaft with said interaxle drive shaft; and further including d. second voltage comparison circuit means for comparing the signal voltages of said second pair of driven wheels and for producing a second signal when the rotational velocity of one driven wheel of said second pair exceeds that of the other driven wheel of the second pair by a predetermined value; and
e. means responsive to said second control signal for placing in the activated condition that brake-locking means which is associated with the driven wheel of said second pair having the greater rotational velocity, thereby to effect braking of the faster wheel of said second wheel pair, whereby driving torque is transferred through said second differential means to the driven wheel of said second wheel pair having the lower rotational velocity.

10. Apparatus as defined in claim 9, and further including
f. means for summing the signal voltages of the wheels of the first wheel pair to produce a first summed signal;
g. means for summing the signal voltages of the wheels of the second wheel pair to produce a second summed signal;
h. third comparison circuit meand for comparing said first and second summed signals and for generating a third control signal when the total rotational velocity of the wheels pair exceeds the total rotational velocity of the wheels of the other driven wheel pair by a predetermined amount; and
i. means responsive to said third control signal for simultaneously placing in the operative condition those brake-locking means which are associated with the wheels of the faster running wheel pair.

11. Apparatus as defined in claim 9, and further including
f. a pair of shaft velocity sensing means associated with said drive and interaxle drive shafts, respectively, for generating drive and interaxle signal voltages which are a function of the rotational velocities of said shafts, respectively;
g. interaxle comparison circuit means for comparing said drive and interaxle signal voltages and for generating a third control signal when the rotational velocity of one wheel pair exceeds that of another wheel pair by a predetermined amount; and h. means responsive to said third control signal for simultaneously placing in the operative condition those brake-locking means which are associated with the wheels of the faster running wheel pair.

12. Traction control means adapted for use with a vehicle braking system including at least one pair of driven wheels connected by a differential mechanism, and a plurality of wheel brake means associated with said driven wheels, respectively, each of said wheel brake means including diaphragm operable between brake-engaged and brake-released positions, and brake spring means (26, 26') biasing the brake diaphragm toward its brake-released position;

said traction control system comprising a. a plurality of locking spring means (28, 28') normally biasing each of said brake diaphragms toward its brake-engaged position;

b. means including a plurality of spring diaphragms (22, 22') associated with said locking spring means, respectively, each of said spring diaphragms being operable between enabling and disabling positions in which the associated locking spring means is in operative and inoperative conditions relative to said brake diaphragm, respectively, and a plurality of housings associated with said wheel brake means, respectively, each of said housings containing superimposed upper and lower diaphragm chambers, said spring and brake diaphragms being mounted in said upper and lower chambers, respectively, thereby to define upper and lower compartments in each of said chambers, said locking spring being a compression spring mounted in the upper compartment of the upper chamber for biasing said spring diaphragm from the spring-disabling position downwardly toward the spring-enabling position, said brake diaphragm spring being mounted in the lower compartment of the lower chamber for biasing the brake diaphragm from the brake-engaged position upwardly toward the brake-released position, and pusher rod means (30, 30') slidably extending through an opening contained in the housing wall which separates the upper and lower chambers, said pusher rod means being operable by said spring diaphragm to force said brake diaphragm toward the brake-engaged position when the spring diaphragm is in the spring-enabling position;

c. first conduit means (46a, 46b) for simultaneously connecting the upper compartments of the lower chambers of the housing with a pressure fluid source to lower the brake diaphragms toward their brake-engaged positons;

d. second conduit means (54a, 54b) for simultaneously connecting the lower compartments of the upper chambers of said housings with a pressure fluid source, thereby to raise the spring diaphragms associated therewith to their spring-disabling positions;

e. a plurality of velocity sensing means for generating signal voltages which are a function of the rotational velocities of said driven wheels, respectively;

f. voltage comparison circuit means for comparing said signal voltages and for producing a control signal when the rotational velocity of one driven wheel exceeds that of the other driven wheel by a predetermined value; and g. means responsive to said control signal for placing in the enabling position the spring diaphragm associated with the driven wheel having the greater rotational velocity, thereby to automatically brake the faster driven wheel, said control signal responsive means including valve means (56, 58) connected in said second conduit means for venting and interrupting the supply of pressure fluid to the lower compartment of the upper chamber of the housing associated with the faster driven wheel, whereby the locking spring of that housing causes the brake diaphragm associated therewith to be lowered to its brake-engaged position effect braking of the faster driven wheel.

13. A traction control system for a vehicle including at least one pair of driven wheels (2, 4) connected by differential means (6), and separate wheel brake means (8, 10) associated with said driven wheels, respectively, comprising a. a pair of spring means (28, 28') normally operating both said wheel brake means to a brake-engaged condition, respectively;

b. means (22, 22', 50) for normally de-activating both said spring means relative to their respective wheel brake means;

c. a plurality of velocity sensing means (60, 62) for generating signal voltages which are a function of the rotational velocities of said driven wheels, respectively;

d. voltage comparison means (64) for comparing said signal voltages of said driven wheels, respectively, and for producing a control signal when the rotational velocity of one driven wheel exceeds that of the other driven wheel by a predetermined value; and e. means (56, 58) responsive to said control signal for activating only that spring means which is associated with the driven wheel having the faster rotational velocity, thereby to effect braking of the faster driven wheel, whereby driving torque is transferred through said differential means to the driven wheel having the lower rotational velocity.

* * * * *